(12) United States Patent  
Alameh et al.

(10) Patent No.: US 8,886,258 B2  
(45) Date of Patent: Nov. 11, 2014

(54) WIRELESS COMMUNICATION DEVICE AND METHOD WITH AN ORIENTATION DETECTOR

(71) Applicant: Motorola Mobility LLC, Libertyville, IL (US)

(72) Inventors: Rachid M Alameh, Crystal Lake, IL (US); Gregory R. Black, Crystal Lake, IL (US); Daniel J Sadler, Gilbert, AZ (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/923,425

(22) Filed: Jun. 21, 2013

(65) Prior Publication Data

US 2013/0281164 A1  Oct. 24, 2013

Related U.S. Application Data

(63) Continuation of application No. 12/051,085, filed on Mar. 19, 2008, now abandoned.

(51) Int. Cl.
| | |
|---|---|
| *H04B 1/38* | (2006.01) |
| *H04W 52/02* | (2009.01) |
| *H04M 1/05* | (2006.01) |
| *H04W 4/16* | (2009.01) |
| *H04M 1/60* | (2006.01) |

(52) U.S. Cl.
CPC ............. *H04W 4/16* (2013.01); *H04W 52/027* (2013.01); *Y02B 60/50* (2013.01); *H04M 1/05* (2013.01); *H04M 1/6066* (2013.01); *H04M 2250/12* (2013.01)
USPC ................. 455/566; 455/343.1; 455/343.2; 455/343.3; 455/343.4; 455/343.5; 455/343.6; 455/41.2; 455/572; 455/574; 702/127; 702/141; 702/150; 702/151; 702/152; 702/153; 702/154; 713/320; 713/321; 713/322; 713/323; 713/324; 713/325; 713/326; 713/327; 713/328; 713/329; 713/330; 713/331; 713/332; 713/333; 713/334; 713/335; 713/336; 713/337; 713/338; 713/339; 713/340

(58) Field of Classification Search
USPC .................. 455/572, 574, 343.1–343.6, 41.2; 713/320–340; 702/127, 141, 150–154
See application file for complete search history.

(56) References Cited

U.S. PATENT DOCUMENTS 5,575,161 A * 11/1996 Hinchey ............................. 63/33  
6,246,862 B1    6/2001 Grivas et al.

(Continued)

FOREIGN PATENT DOCUMENTS

| JP | 2003-179790 A | 6/2003 |
|---|---|---|
| JP | 2003-224655 A | 8/2003 |

(Continued)

OTHER PUBLICATIONS

International Search Report and Written Opinion from International Application No. PCT/US2009/036257, dated Jan. 11, 2010, 10 pp.

(Continued)

*Primary Examiner* — Amancio Gonzalez  
(74) *Attorney, Agent, or Firm* — Shumaker & Sieffert, P.A.

(57) ABSTRACT

A wireless communication device (200) is disclosed. It can include: an electronic device (210) including a display (240); a wearable device (242) including a first orientation detector (244) configured to detect a suitable display viewing orientation; and a controller (220) including a power saving module (290) coupled to the electronic device (210), the controller (220) configured to control the operations of at least the display (240) in response to a suitable orientation detection. Advantageously, the wireless communication device (200) can provides a simple, portable, compact and robust power savings feature that can actuate a display when properly orientated for viewing by a user and not actuate the display when not suitably oriented.

17 Claims, 8 Drawing Sheets

(56) References Cited

U.S. PATENT DOCUMENTS

| | | |
|---|---|---|
| 7,010,332 B1 | 3/2006 | Irvin et al. |
| 7,016,705 B2 | 3/2006 | Bahl et al. |
| 2007/0075127 A1 | 4/2007 | Rosenberg |
| 2007/0195074 A1 | 8/2007 | Gelissen |
| 2007/0263003 A1 | 11/2007 | Ko et al. |
| 2007/0287399 A1* | 12/2007 | Lee .................. 455/226.2 |
| 2008/0112567 A1 | 5/2008 | Siegel et al. |
| 2008/0194337 A1 | 8/2008 | Hensel |

FOREIGN PATENT DOCUMENTS

| | | | | |
|---|---|---|---|---|
| JP | 2004-294283 A | 10/2004 | | |
| KR | 10-0650062 B1 | 11/2006 | | |
| WO | WO 2006046169 A1 * | 5/2006 | ................ | A63F 9/04 |

OTHER PUBLICATIONS

International Preliminary Report on Patentability from International Application No. PCT/US2009/036257, dated Sep. 30, 2012, 5 pp.

Office Action from U.S. Appl. No. 12/051,085, dated May 16, 2011, 17 pp.

Response to Office Action dated May 16, 2011 from U.S. Appl. No. 12/051,085, filed Sep. 30, 2011, 9 pp.

Office Action from U.S. Appl. No. 12/051,085, dated Feb. 17, 2012, 17 pp.

Response to Office Action dated Feb. 17, 2012, from U.S. Appl. No. 12/051,085, filed May 15, 2012, 9 pp.

* cited by examiner

WIRELESS COMMUNICATION DEVICE AND METHOD WITH AN ORIENTATION DETECTOR

BACKGROUND

1. Field

The present disclosure is directed to a wireless communication and computing device and method with an orientation detector.

2. Introduction

Wireless communication and computing devices (herein referred to individually and collectively as wireless communication devices) are multi-function in nature, with each function, or application, satisfying a user's purpose. Some applications are more important to a user than others, depending on context. For example a phone calling function may be of considerably greater importance than a gaming application. The importance may also be dependant on the location or position of the device vis-à-vis the user. For example a display function is of lesser importance when not in position suitable for viewing by a user. Wireless communication devices may contain data of a valuable or sensitive nature. A user may therefore have a need for the operation of the device to be secure and private. The security and privacy may also be dependant on the location or position of the device vis-à-vis the user. For example a display device may be less private when not in position suitable for viewing by a user.

Wireless computing devices, such as mobile devices, operate with a limited energy supply, such as a battery, fuel cell or the like. While the energy supply is generally rechargeable, it may not always be convenient or even possible for a user to recharge the energy supply. Accordingly, there is a need to maximize the useful time of device operation. Thus, there is a need for disabling of operational modes, in order to conserve energy or prolong useful battery life. For a mobile computing device having several operational modes, this disabling may not be convenient or easy for a user. There is a need for a method and device for automatically disabling operational modes, for example, according to its importance and recent state.

Thus, there is a need for a method and device for prolonging the useful life of an energy storage device in wireless communication devices, and for secure and private operation.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
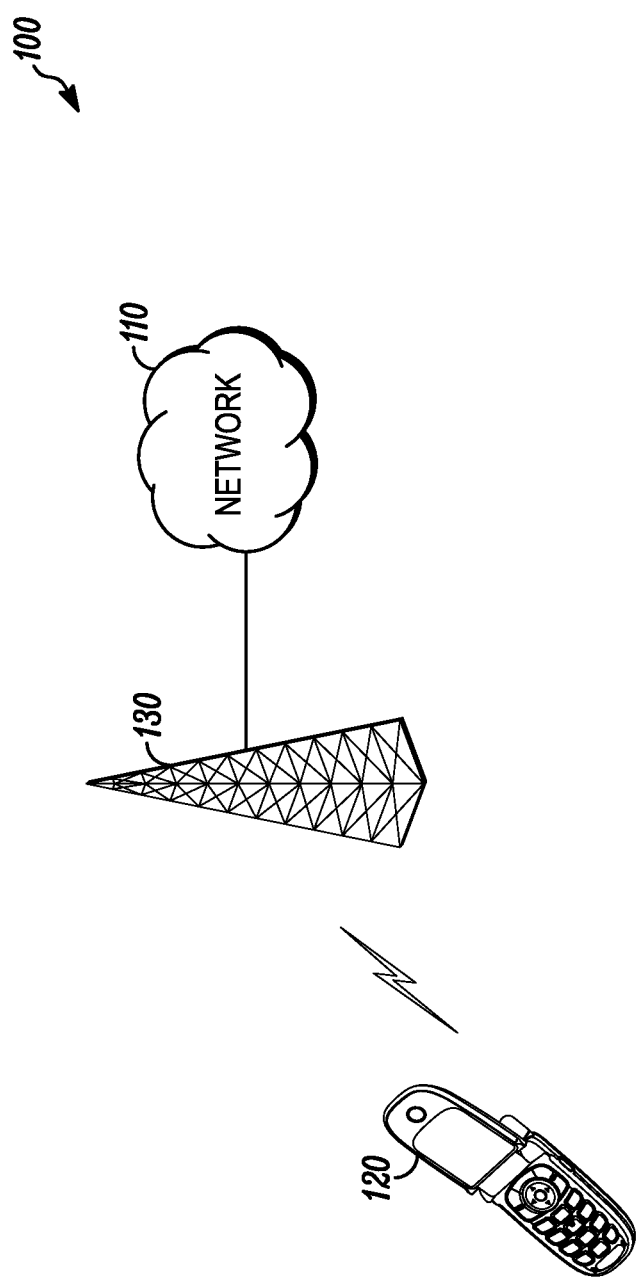
FIG. 1 is an exemplary block diagram of a communication system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a selective call receiver, or any other device that is capable of sending and receiving communication signals on a network including wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a Third Generation (3G) network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130.

Figure 2:
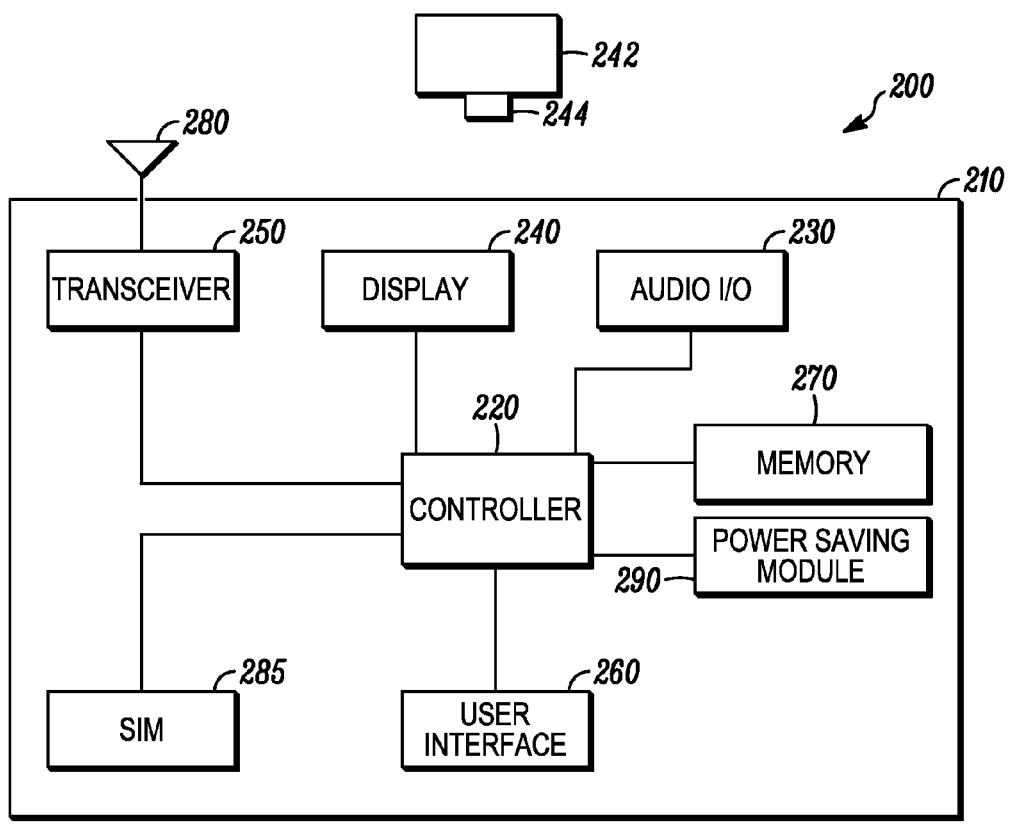
FIG. 2 is an exemplary block diagram of a wireless communication device according to one embodiment.

FIG. 2 is an exemplary block diagram of a wireless communication and/or computing device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module (SIM) 285 coupled to the controller 220. The wireless communication device 200 can include wireless communication device 200 also includes a power saving module 290 coupled to the controller 220. The power saving module 290 can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

In its simplest form, a wireless communication device 200 is shown in FIG. 2. It can include: an electronic device 210 including a display 240; a wearable device 242 including a first orientation detector 244 configured to detect a suitable display viewing orientation; and a controller 220 including a power saving module 290 coupled to the electronic device 210, the controller 220 configured to control the operations of at least the display 240 in response to a suitable orientation detection. Advantageously, the wireless communication device 200 can provides a simple, portable, compact and robust power savings feature that can actuate a display when properly orientated for viewing by a user, and not actuate the display when not suitably oriented.

In addition, the wireless communication device 210 can provide a privacy feature, access feature and authentication feature, to enable the display only when properly oriented.

Figure 3:
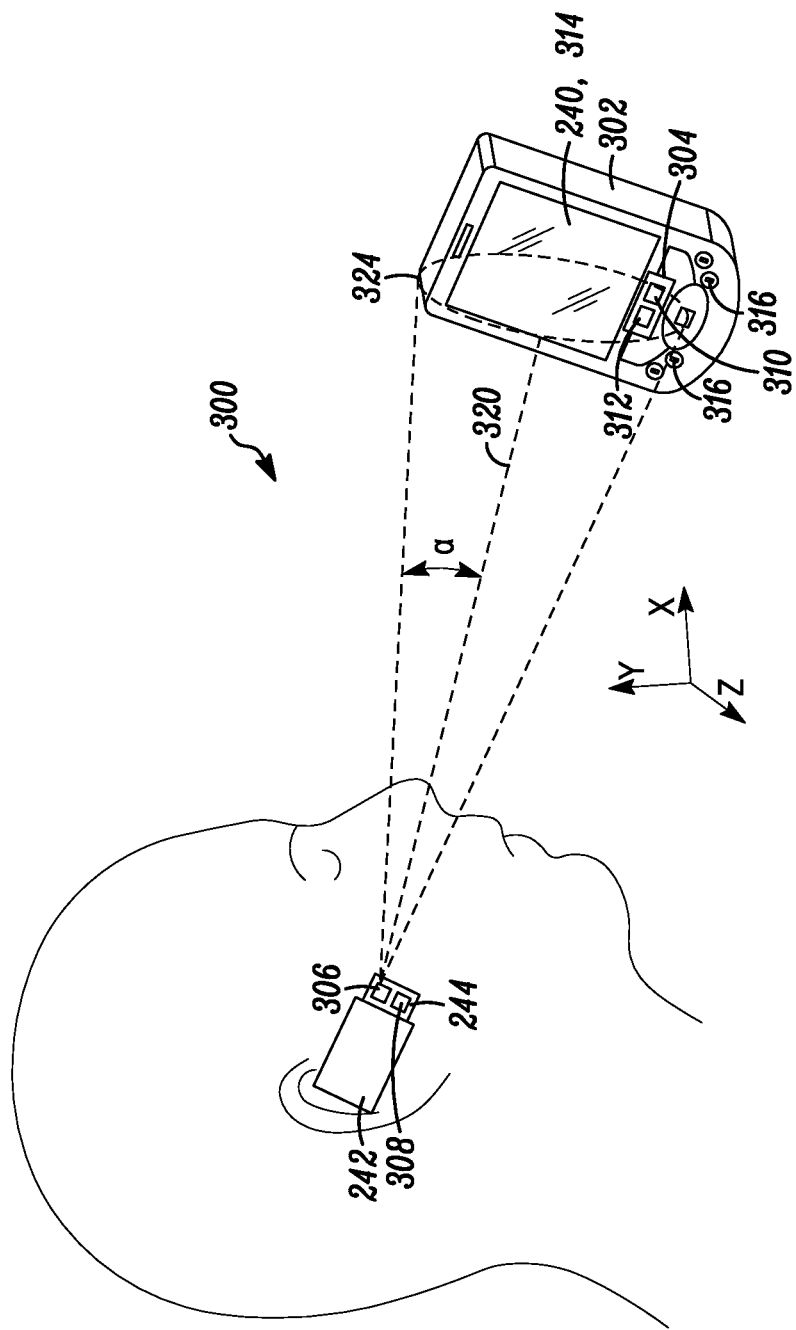
FIG. 3 is a perspective view of a wireless communication according to one embodiment.

In FIG. 3, an embodiment of a wireless communication device 300 (200 in FIG. 2), is shown. The electronic device 302 (210 in FIG. 2) can include a second orientation detector 304 and the display 240 is controlled in response to the first 244 and second orientation detectors 304, such that the display 240 is enabled when the first and second orientation detectors 244 and 304 are possibly aligned.

This arrangement provides a display enabled or on, such as backlighting and/or the monitor enabled, when properly oriented, and off when not suitably oriented.

In more detail, in one embodiment, orientation detector 244 can include at least one of a light source 306 and light detector 308, and orientation detector 304 includes at least one of a light detector 310 and a light source 312, respectively. This arrangement allows optimization of orientation detectors to minimize energy drain from energy storage devices in the wireless communication device 302 and the wearable device 242.

In one arrangement, the display includes a primary display 314 on a front side of the electronic device 302 and a secondary illumination display, such as a key-illumination 316. Thus, a plurality of displays can be controlled or enabled, individually or collectively as desired, such as an LCD and illuminated keys, as shown in FIG. 3. As should be understood by those skilled in the art, various display(s) and features can be provided, such as, at least one of a primary display, secondary display, primary and secondary display illumination, keypad illumination, key illumination, side button illumination, backlighting, user input or screen navigation devices such as a capacitive touchscreen, joystick, trackball and associated device illumination. In the case where a secondary display is located on the device, such that the viewing direction is different from the primary display viewing direction then a separate dedicated orientation sensor may be employed for the secondary display. Advantageously, this can provide a user with a number of options when suitably oriented.

The electronic device 302 can include at least one of a privacy feature, access feature and authentication feature, to actuate a display only when properly oriented. Thus, in a desktop application, for example, a video display may be disabled when the user is not in a position to view the display. These features could be of even greater importance than power saving concerns. For example, if an application were to require the user to provide sensitive information, for example personal health information or a bank account information which is shown on the display, the privacy and security of that information would be enhanced and preserved, if the screen were blocked out or disabled whenever the user's line of sight is directed away from the device, or similarly whenever the display is oriented away from the user's viewing direction.

Turning to the controller 220 in FIG. 2, the controller 220 can be configured to control the operations of at least one of font size, screen resolution, screen active area, light intensity and contrast. This provides not only the ability to enable and disable the display, but to provide a range of power settings and viewing experiences depending, for example, on the viewing angle or distance. The power saving and privacy features may be employed to display related modes, such as micro-processors for controlling the display, a display driver for integrated circuits, and a display memory device. The power-saving and privacy features may be employed on non-display modes as well, such as user interface devices including keypads, optical navigation, touch sensitive surfaces, joysticks, trackballs, and the like. The power saving and privacy features may also be employed on other modes such as personal area and local area communications devices, such as Bluetooth, Zigbee, or Near Field Communication (NFC) devices which may be used for communication between the wireless communication device 302 and the wearable device 242.

In connection with the orientation detectors 244 and 304, they can include one or more of an accelerometer, magnetometer, compass, light or other radiation emitters and detectors. In a preferred embodiment, the orientation detectors 244 and 304 each includes an accelerometer, for detecting proper orientation and desired alignment. For example a three dimensional accelerometer may be employed on the wearable device and mobile communication and computing device. The accelerometers may be used to infer the device tilt with respect to the earth by measuring the direction of gravitational force. Tilt data may then be employed to enable or disable a device operational mode. A second preferred embodiment may employ light emitters on a wearable device for directing light along the line of site of the user, and light detectors on the mobile communication and computing device for detecting a component of the directed light arriving normal to the display. Alternatively the source may be on the mobile communication and computing device and the detector on the wearable device. While the first preferred embodiment has the advantage of simplicity it has the disadvantage of not providing a completely reliable indication that the device is in a suitable orientation vis-à-vis the user. The second preferred embodiment may have the disadvantage of the light emitter and sensor causing unwanted power drain from an energy source. Thus, a third preferred embodiment is a combination of the first and second preferred embodiments, whereby an accelerometer is used to enable the light emitter and sensors, thereby reducing the power drain and providing a more accurate indication of device orientation. Referring to FIG. 3, the orientation detectors 244 can include detecting the orientation of the wearable device 242 and the electronic device 302 and enabling a second orientation detector 304 thereafter.

In a preferred embodiment, the wireless communication device 302 includes an energy storage device, such as, at least one of a battery, a fuel cell, a fuel container and an electrochemical capacitor, which are particularly adapted for portable applications in electronic components with displays, such as mobile telephones.

As shown in FIG. 3, the wearable device 242 can be worn such that it moves in unison with a user's head position and maintains substantial alignment with a user's line of sight 320. Alignment may be described as being located within a virtual cone 324 constructed by rotating at angle α around the line of sight 320, as depicted in FIG. 3.

Advantageously, this arrangement follows and tracks a line of sight, which is directed normal to a virtual plane of the user's face. In one embodiment, the wearable device 242 can be embedded in an ear piece, such as in a Bluetooth headset or attached to a user's glasses, for example, such that the device moves with the user's head, and can thereby provide an approximate measure of the variable line of sight.

Returning to the wireless communication device 200 shown in FIG. 2, in a preferred embodiment, it can include a two way radio, a mobile telephone and the like, and include: a housing 210; a controller 220 coupled to the housing 210, the controller 220 configured to control the operations of the wireless communication device; memory 270 coupled to the controller 220; memory 270 coupled to the controller 220; a transceiver 250 coupled to the controller 220; and a power saving module 290. It can further include a wearable device 242 including a first orientation detector 244 configured to detect a suitable display viewing orientation and the controller 220 can be coupled to the wireless communication device 200, the controller 220 configured to control the operations of the wireless communication device and to control the operations of at least one display in response to a suitable orientation detection. Advantageously, the wireless communication device can provide power savings when not in a suitable orientation, thus providing longer energy storage or battery life and an enhanced user experience.

Figure 4:
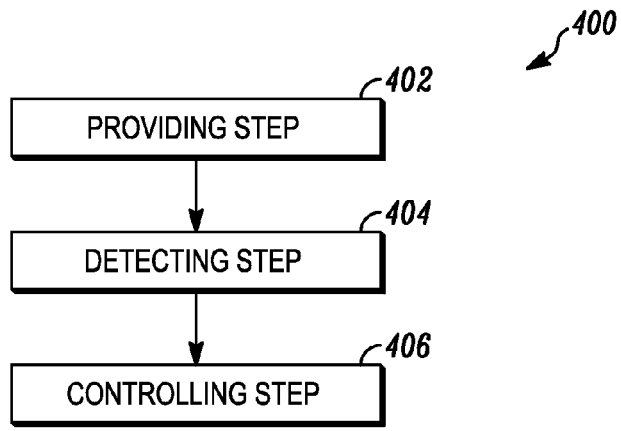
FIG. 4 is an exemplary flowchart illustrating the operation of a wireless communication device according to another embodiment.

In FIG. 4, a wireless communication method 400 with a wearable device is shown. It can include the steps of: providing 402 a wearable device, a wireless communication device including a display, and a controller configured to control the operations of the wireless communication device; detecting 404 a suitable display orientation; and controlling 406 the operations of at least the display in response to a suitable orientation detection. This method 400 can provide power savings when not in a suitable orientation. Additionally, the method 400 can provide a privacy feature, a security feature, an access feature and/or an authentication feature, to enable the display only when properly oriented, as detailed above.

As detailed earlier, the method 400 can also provide at least a primary display and a secondary illumination display, as desired. The method thereby enables energy consumption only on the displays which are suitable for viewing, along with associated modes and devices.

In a portable application, for example, the method 400 can provide an energy storage device including at least one of a battery, a fuel cell, a fuel container and an electrochemical capacitor. The method is particularly adapted for saving power in such applications.

In one arrangement, the providing step 402 can include providing the wearable device in a personal area network headset, such as a Bluetooth headset, which step can be particularly useful in two radio and mobile phone applications, for example.

Also, in one arrangement, the providing step 402 can include providing memory and a transceiver coupled to the controller, which step is useful in two way radio and mobile phone applications, for example.

In a preferred embodiment, the detecting step 404 can include providing a first level detection configured to detect a first orientation vector of a communication and computing device with respect to a force of gravity vector, and a second level detection configured to detect a second orientation vector of a wearable device with respect to the force of gravity vector. The detecting step can include determining that both of the orientation vectors are suitable for viewing. The detecting step can further include determining that the first and second devices are compatibly oriented for viewing. For example, if a first and second orientations are toward the horizon then the devices may be compatibly oriented for viewing, however if the first and second devices are both oriented in parallel with the gravity vector, for example, both toward ground or both toward the sky, then the devices are not compatibly oriented. Alternatively the compatible orientation for viewing can be detected by detecting alignment of a light source and a light detector.

Figure 5:
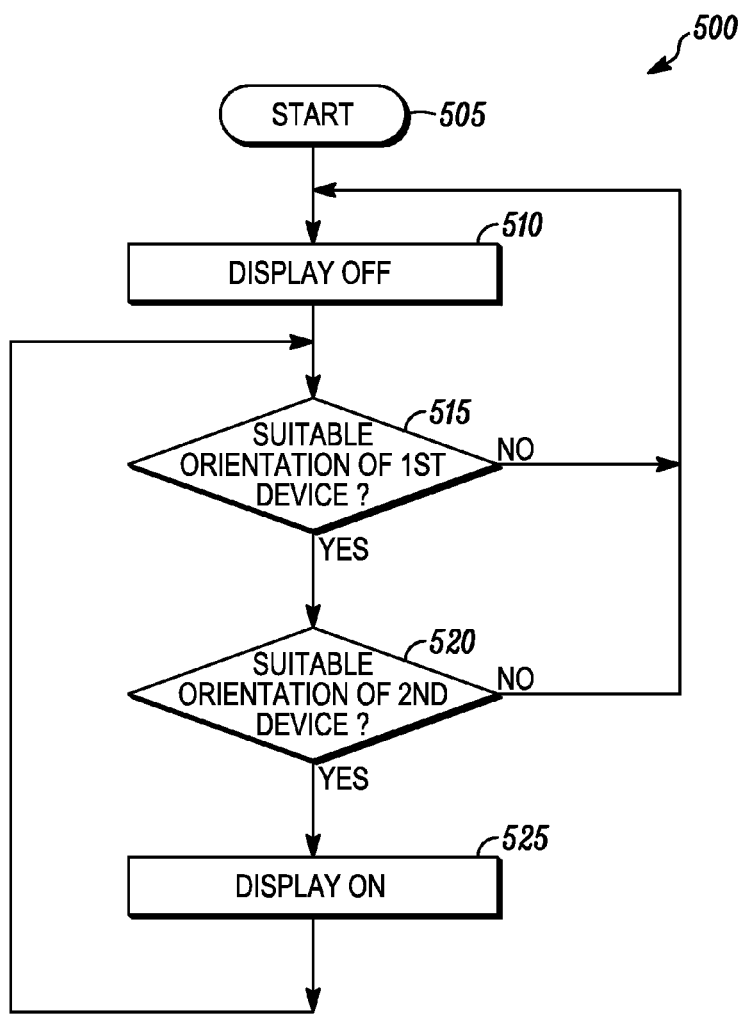
FIG. 5 is an exemplary flowchart illustrating the operation of a wireless communication device according to another embodiment.

FIG. 5 is an exemplary flowchart 500 illustrating the operation of a wireless communication device according to an embodiment. At step 505 the process begins, such as when a device is turned on or a display is manually enabled. The display remains off or is turned off at step 510. At step 515 the orientation is determined of a first device. If at step 515 the determined orientation is suitable for viewing then at step 520 the orientation is determined of second device. If at step 515 the determined orientation is not suitable for viewing then the flow returns to step 510 and the device is turned off. If at step 520 the determined orientation is suitable for viewing then at step 525 the display is turned on and the flow returns to step 515. If at step 520 the determined orientation is not suitable for viewing then the flow returns to step 510 and the display is turned off.

Figure 6:
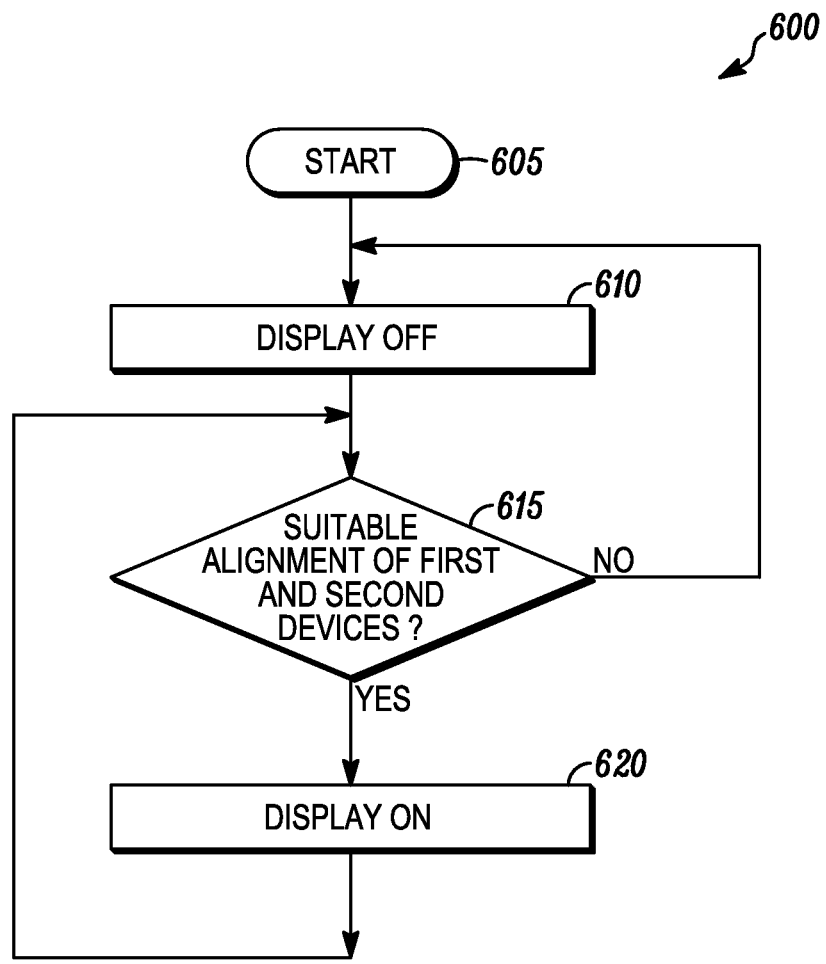
FIG. 6 is an exemplary flowchart illustrating the operation of a wireless communication device according to another embodiment.

FIG. 6 is an exemplary flowchart 600 illustrating the operation of a wireless communication device according to another embodiment. At step 605 the process begins, such as when a device is turned on or a display is manually enabled. The display remains off or is turned off at step 610. At step 615 the orientation alignment of a first device and a second device is determined. If at step 615 the determined orientations are suitably aligned for viewing is then at step 620 the display is turned on and the flow returns to step 615. If at step 615 the determined orientations are not suitably aligned for viewing then the flow returns to step 610 and the display is turned off.

Figure 7:
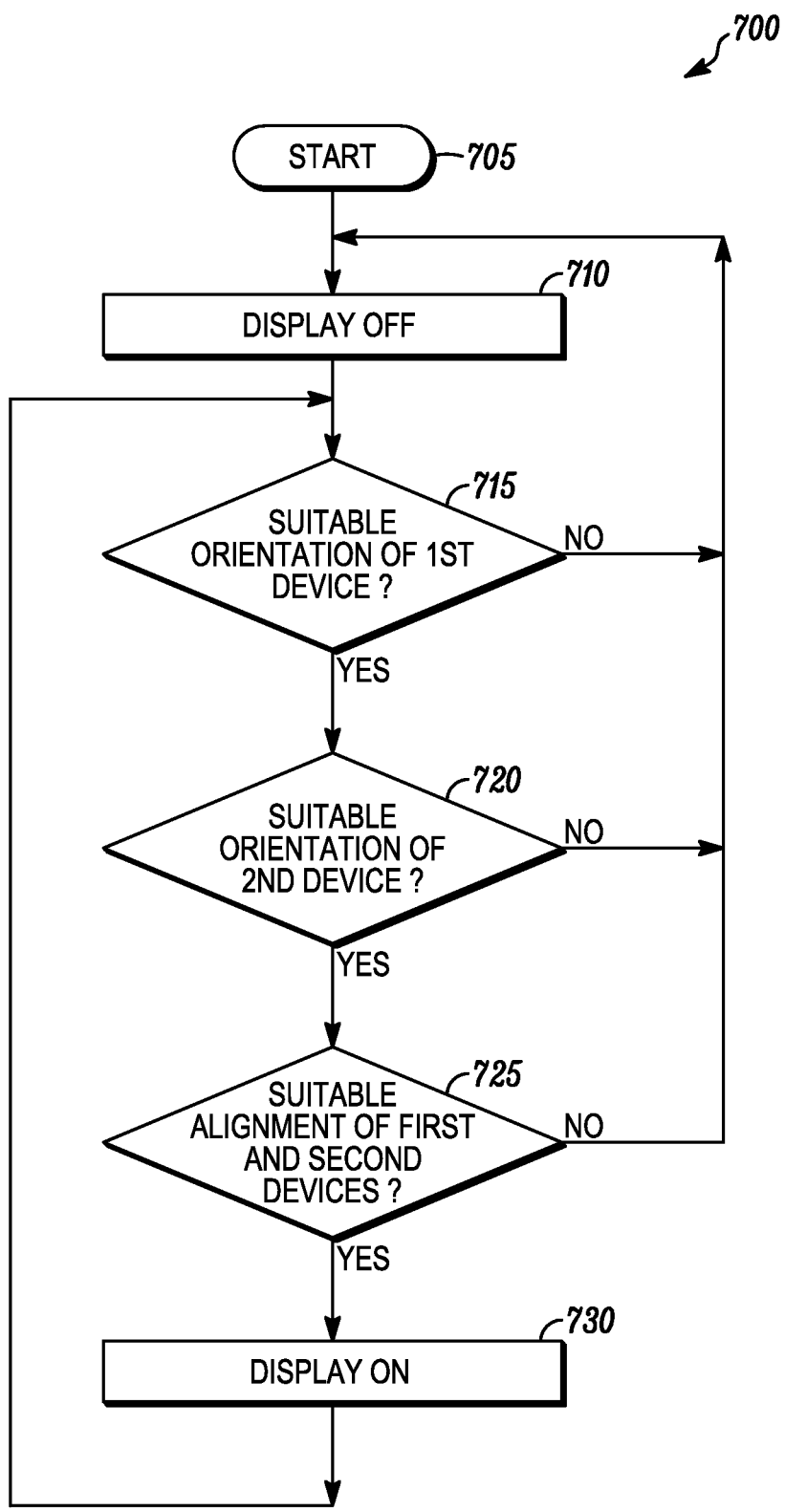
FIG. 7 is an exemplary flowchart illustrating the operation of a wireless communication device according to an embodiment.

FIG. 7 is an exemplary flowchart 700 illustrating the operation of a wireless communication device according to an embodiment. At step 705 the process begins, such as when a device is turned on or a display is manually enabled. The display remains off or is turned off at step 710. At step 715 the orientation is determined of a first device. If at step 715 the determined orientation is suitable for viewing then at step 720 the orientation is determined of second device. If at step 715 the determined orientation is not suitable for viewing then the flow returns to step 710 and the device is turned off. If at step 720 the determined orientation is not suitable for viewing then the flow returns to step 710 and the device is turned off. If at step 720 the determined orientation is suitable for viewing then at step 725 the orientation alignment of a first device and a second device is determined. If at step 725 the determined orientations are suitably aligned for viewing, then at step 730 the display is turned on and the flow returns to step 715. If at step 715 the determined orientations are not suitably aligned for viewing then the flow returns to step 710 and the display is turned off.

Figure 8:
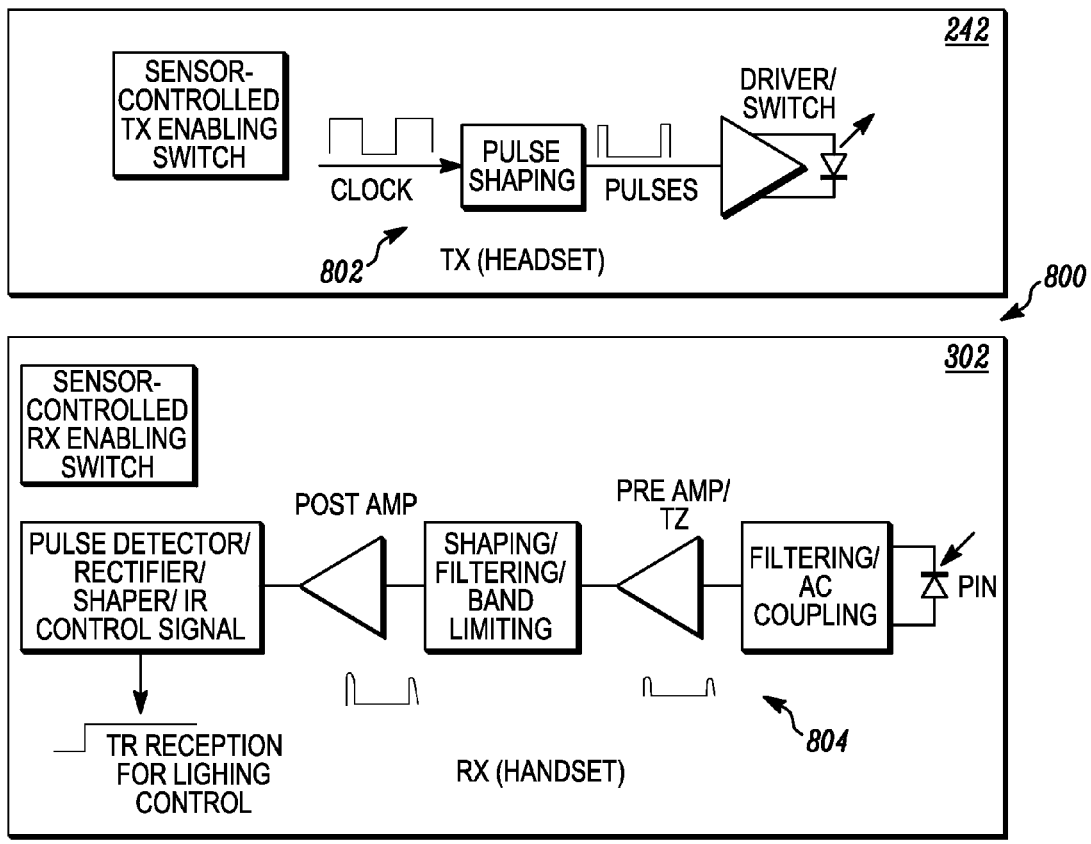
FIG. 8 is an exemplary block diagram of an orientation detector for a wireless communication device according to one embodiment.

There are three infrared (IR) embodiments. FIG. 8 is an exemplary block diagram 800 according to one embodiment, illustrating how the communication device 302 and the wearable device 242 wirelessly communicate. In this embodiment, the wearable device 242 includes a transmitter 802 and the communication device 302 includes a receiver 804, in the form of Infra red transmitter and receiver. The transmitter 802 is driven by a clock source, such as from a processor or a stand alone oscillator. The clock source can be shaped to generate narrow pulses before transmission, to minimize light emitting diode (LED) ON time for power saving. For example, using a 5 Hz square wave oscillator (which equates to 200 ms oscillation period), an LED peak current of 2 mA results in LED IR average current of 1 mA. This is very high for product implementation. Preferably, if pulses of about 100 ns duration are used, the LED average current becomes about 0.5 microA, a much more acceptable value. Low cost LEDs are readily available for much less than 100 nS pulse durations. The pulses are fed into an LED driver, such as a simple transistor switch operating in on/off mode.

Turning to the receiver 804, a PIN/receiver diode (PN junction with an intrinsic layer) can be used as a detector. As should be understood by those skilled in the art, phototransistors or other light devices can be used. The PIN diode can be ac coupled into a preamp stage for background noise rejection and filtering and to minimize forward biasing or saturating the PIN diode under high interference. The preamp can be a trans-impedance type commonly used in this type of application. Other schemes can be used, such as dc coupling, high impedance preamps and the like. Following the preamp, the signal undergoes further band limiting, LP filtering, and additional amplification via a post amp. Then the amplified pulses are rectified for received signal presence or absence detection. The rectified signal can be used to drive a comparator stage, A/D stage or others for providing display lighting control.

Alternatively, in a second embodiment, the wearable device 242 could include the receiver and the communication device 302 could include the transmitter, as should be understood.

In one embodiment, the TX transmit pulses or IR receiver can be powered on, based on a sensor, such as a tilt accelerometer in one or both of a headset and a handset, indicating a general first order approximation possible line of sight alignment between the wearable device 242 and the communication device 302.

The second embodiment has the IR transmitter in the handset and IR receiver in the headset. Transmission and reception can be enabled all the time or as driven by other sensors, as detailed above. Once the IR receiver receives an IR signal from the handset, it communicates back to the handset via a wireless link, for example a Bluetooth (BT) or other available wireless link, to control the display lighting.

Figure 9:
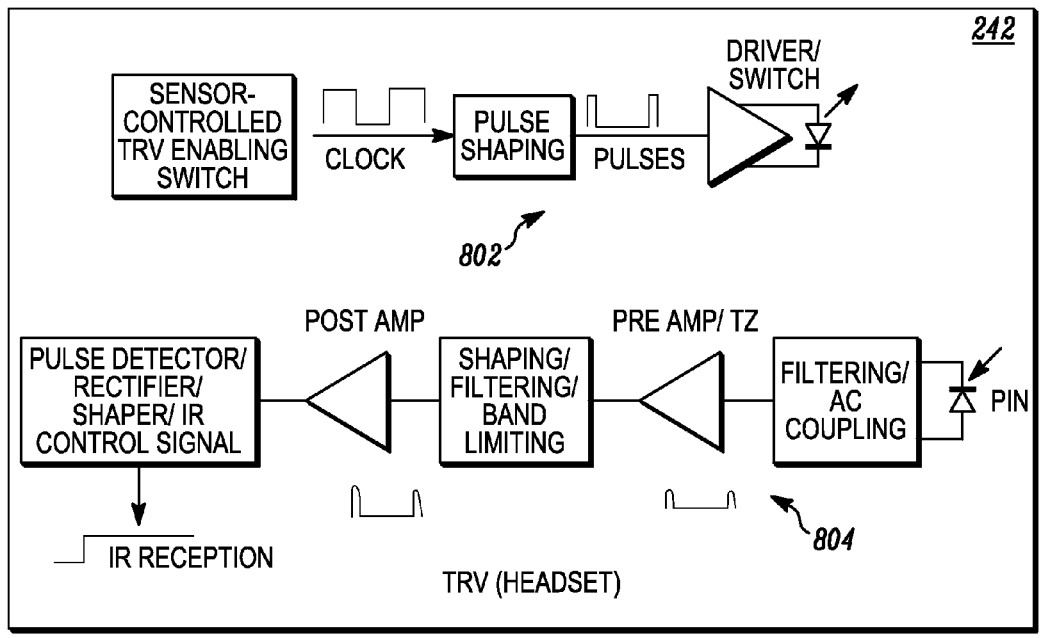
FIG. 9 is an exemplary block diagram of an orientation detector for a wireless communication device according to another embodiment.
Figure 9:
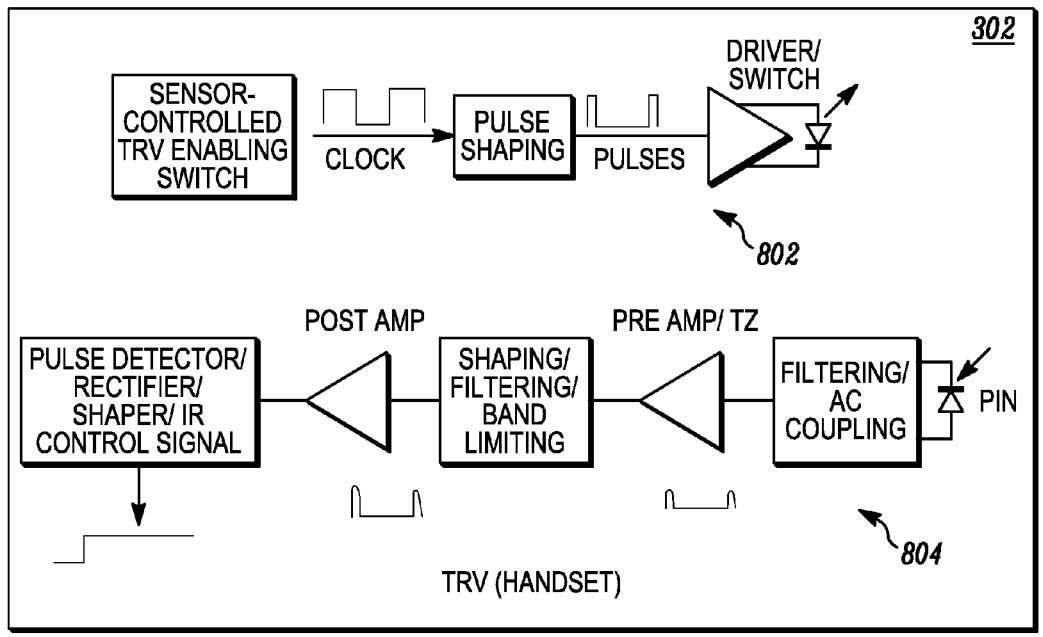

As shown in FIG. 9, a third embodiment is provided illustrating how the communication device 302 and the wearable device 242 wirelessly communicate. Transmission/reception of the IR hardware can be enabled all the time, or as driven by other sensors as detailed previously. Other possibilities can include an IR transceiver in the handset being on and transmitting pulses, an IR receiver in the headset being on and receiving from handset. When a signal is received, the headset transmitter is enabled to communicate back to a handset for display lighting control. It is easy to envisage by those skilled in the art, other combinations and powering hardware enabling sequences or as driven by other sensors.

The devices 200 and 300 and method 400 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An electronic device comprising:
   a display device;
   a receiver configured to receive an indication of an orientation of a wearable device, the wearable device being wearable by a user;
   an orientation detector configured to detect an orientation of the electronic device; and
   a controller configured to:
      determine, based on both the orientation of the wearable device and the orientation of the electronic device, whether the display device is suitably oriented for viewing by the user; and
      control, at least in part, and based on whether the display device is suitably oriented for viewing by the user, an operation of the display device.

2. The electronic device of claim 1, wherein the orientation detector comprises an element selected from a group consisting of a light source, a light detector, an accelerometer, a magnetometer, and a compass.

3. The electronic device of claim 1, wherein the controller is configured to control an element associated with the operation of the display device, the element being selected from a group consisting of, a display resolution, a display active area, a light intensity, and a contrast.

4. The electronic device of claim 1, wherein the display device includes at least at least one of a primary display or a secondary display.

5. The electronic device of claim 1, wherein the wearable device is attached to an ear piece or glasses of the user.

6. The electronic device of claim 1, wherein responsive to determining both that the display device is currently turned off and also that the display device is suitably oriented for viewing by the user, the controller is configured to control the operation of the display device at least by turning on the display device.

7. The electronic device of claim 1, wherein responsive to determining both that the display device is currently turned on and also that the display device is not suitably oriented for viewing by the user, the controller is configured to control the operation of the display device at least by turning off the display device.

8. The electronic device of claim 1, wherein the orientation detector comprises a first sensor and a second sensor different from the first sensor, and wherein the controller is configured to determine whether the display device is suitably oriented for viewing by the user at least by:
   determining, based on first sensor information from the first sensor, whether the orientation of the electronic device comprises a suitable viewing orientation; and
   responsive to determining that the orientation of the electronic device comprises the suitable viewing orientation, determining, based on second sensor information from the second sensor, whether the orientation of the wearable device is aligned with the orientation of the electronic device.

9. The electronic device of claim 8, wherein the first sensor comprises an accelerometer, wherein the second sensor comprises at least one of a first light source or a first light detector, and wherein the controller is configured to determine whether the orientation of the wearable device is aligned with the orientation of the electronic device at least by determining, based on the second sensor information, a line of sight alignment between the at least one of the first light source or the first light detector and the at least one of the second light source or the second light detector.

10. The electronic device of claim 9, wherein responsive to determining, based on the first sensor information, that the orientation of the electronic device comprises the suitable viewing orientation, the controller is further configured to enable the at least one of the first light source or the first light detector of the electronic device.

11. A method comprising:
   receiving, by an electronic device, an indication of an orientation of a wearable device, the wearable device being wearable by a user;
   determining, by the electronic device, an orientation of the electronic device;
   determining, by the electronic device and based on both the orientation of the wearable device and the orientation of the electronic device, whether a display device of the electronic device is suitably oriented for viewing by the user; and
   controlling, by the electronic device, at least in part, and based on whether the display device is suitably oriented for viewing by the user, an operation of the display device.

12. The method of claim 11, wherein controlling the operation of the display device comprises, responsive to determining both that the display device is currently turned off and also that the display device is suitably oriented for viewing by the user, turning on the display device.

13. The method of claim 11, wherein controlling the operation of the display device comprises, responsive to determining both that the display device is currently turned on and also that the display device is not suitably oriented for viewing by the user, turning off the display device.

14. The method of claim 11, wherein determining whether the display device is suitably oriented for viewing by the user comprises:
   determining, based on first sensor information from a first sensor of the electronic device, whether the orientation of the electronic device comprises a suitable viewing orientation; and
   responsive to determining that the orientation of the electronic device comprises the suitable viewing orientation, determining, based on second sensor information from a second sensor of the electronic device, whether the orientation of the wearable device is aligned with the orientation of electronic device, the second sensor being different from the first sensor.

15. The method of claim 14, wherein the first sensor comprises an accelerometer, wherein the second sensor comprises at least one of a first light source or a first light detector, wherein the wearable device comprises at least one of a second light source or a second light detector, and wherein determining whether the orientation of the wearable device is aligned with the orientation of the electronic device further comprises determining, based on the second sensor information, a line of sight alignment between the at least one of the first light source or the first light detector and the at least one of the second light source or the second light detector.

16. The method of claim 15, further comprising:
   responsive to determining, based on the first sensor information, that the orientation of the electronic device comprises the suitable viewing orientation, enabling the at least one of the first light source or the first light detector of the electronic device.

17. A non-transitory computer-readable storage medium comprising instructions that, when executed, cause a processor of an electronic device to perform operations comprising:
   receiving an indication of an orientation of a wearable device, the wearable device being wearable by a user;
   determining an orientation of the electronic device; determining, based on both the orientation of the wearable device and the orientation of the electronic device, whether a display device of the electronic device is suitably oriented for viewing by the user; and
   controlling, at least in part, and based on whether the display device is suitably oriented for viewing by the user, an operation of the display device.

* * * * *